US012810449B2

(12) United States Patent
Yoo et al.

(10) Patent No.: US 12,810,449 B2
(45) Date of Patent: Nov. 24, 2026

(54) AUTOMATIC MONOCULAR DEPTH PERCEPTION CALIBRATION FOR CAMERA

(71) Applicant: Faurecia IRYStec Inc., Montreal (CA)

(72) Inventors: Hyunjin Yoo, Nepean (CA); Pranjay Shyam, Montreal (CA); Jean Lorchat, Montreal (CA)

(73) Assignee: Faurecia IRYStec, Inc., Montreal (CA)

( * ) Notice: Subject to any disclaimer, the term of this patent is extended or adjusted under 35 U.S.C. 154(b) by 297 days.

(21) Appl. No.: 18/397,806

(22) Filed: Dec. 27, 2023

(65) Prior Publication Data

US 2025/0218009 A1 Jul. 3, 2025

(51) Int. Cl.

*G06T 7/50* (2017.01)
*G06T 7/11* (2017.01)
*G06T 7/70* (2017.01)
*G06T 7/80* (2017.01)

(52) U.S. Cl.

CPC .................. *G06T 7/50* (2017.01); *G06T 7/11* (2017.01); *G06T 7/70* (2017.01); *G06T 7/80* (2017.01); *G06T 2207/20081* (2013.01); *G06T 2207/20084* (2013.01); *G06T 2207/30252* (2013.01)

(58) Field of Classification Search

CPC ..... G06T 7/11; G06T 7/50; G06T 7/70; G06T 7/80; G06T 2207/20081; G06T 2207/20084; G06T 2207/30252

See application file for complete search history.

(56) References Cited

U.S. PATENT DOCUMENTS

| | | | | |
|---|---|---|---|---|
| 11,321,863 | B2 * | 5/2022 | Guizilini | H04N 13/128 |
| 11,948,310 | B2 * | 4/2024 | Guizilini | G06T 7/55 |
| 2013/0222543 | A1 | 8/2013 | Bae | |
| 2020/0410259 | A1 * | 12/2020 | Srinivasan | G01S 7/4808 |

(Continued)

FOREIGN PATENT DOCUMENTS

| | | | |
|---|---|---|---|
| CN | 115393409 | A | 11/2022 |
| EP | 4150528 | A1 | 3/2023 |
| WO | 2022165722 | A1 | 8/2022 |

OTHER PUBLICATIONS

Cheng et al. "Panoptic-deeplab: A simple, strong, and fast baseline for bottom-up panoptic segmentation." Proceedings of the IEEE/CVF conference on computer vision and pattern recognition. 2020. (Year: 2020).*

(Continued)

*Primary Examiner* — Katrina R Fujita

(74) *Attorney, Agent, or Firm* — Reising Ethington P.C.

(57) ABSTRACT

A system and method are provided for estimating a depth of an object within an image and training a depth estimation network. The depth estimation method includes: obtaining single-frame image data; obtaining scaling factor data based on the single-frame image data; generating scale-invariant depth data through inputting the single-frame image data into a depth estimation network; and generating metric depth data based on the scaling factor data and the scale-invariant depth data. The training method includes: inputting image data into a teacher machine learning (ML) model in order to generate metric depth data; inputting image data into a student ML model in order to generate scale-invariant depth data; and training a student network based on loss calculated using the metric depth data and the scale-invariant depth data.

18 Claims, 8 Drawing Sheets

(56) References Cited

U.S. PATENT DOCUMENTS

| | | | | |
|---|---|---|---|---|
| 2021/0118184 | A1* | 4/2021 | Pillai | G06F 9/30196 |
| 2022/0004803 | A1 | 1/2022 | Li et al. | |
| 2022/0148203 | A1* | 5/2022 | Guizilini | G01S 17/86 |
| 2022/0156971 | A1* | 5/2022 | Guizilini | G06V 10/82 |
| 2022/0292351 | A1 | 9/2022 | Etemad et al. | |
| 2022/0343521 | A1* | 10/2022 | Wofk | G06T 7/50 |
| 2023/0042750 | A1* | 2/2023 | Kumar | G06N 3/045 |
| 2023/0114028 | A1* | 4/2023 | Yucel | G06V 10/82 382/100 |
| 2023/0236219 | A1* | 7/2023 | Zhou | G06T 7/80 382/106 |
| 2023/0351767 | A1* | 11/2023 | Bhargava | G06V 10/82 |
| 2024/0020876 | A1* | 1/2024 | Shoeb | G01S 19/485 |
| 2024/0029306 | A1* | 1/2024 | Bhat | G06T 7/50 |
| 2024/0087151 | A1* | 3/2024 | Guizilini | G06T 7/55 |
| 2024/0127509 | A1* | 4/2024 | Hold-Geoffroy | G06T 3/4046 |
| 2024/0177329 | A1* | 5/2024 | Cai | G06T 3/4046 |
| 2024/0217538 | A1* | 7/2024 | Guizilini | B60W 40/02 |
| 2024/0303838 | A1* | 9/2024 | Dana | G06T 3/40 |
| 2024/0312251 | A1* | 9/2024 | Jangid | G06T 7/10 |
| 2024/0420354 | A1* | 12/2024 | Kappi | G06V 20/58 |

OTHER PUBLICATIONS

Petrova et al. "MonoDVPS: A Self-Supervised Monocular Depth Estimation Approach to Depth-aware Video Panoptic Segmentation."2023 IEEE/CVF Winter Conference on Applications of Computer Vision (WACV). IEEE, Jan. 2023. (Year: 2023).*

Pirvu et al. "Depth distillation: unsupervised metric depth estimation for UAVs by finding consensus between kinematics, optical flow and deep learning." Proceedings of the IEEE/CVF Conference on Computer Vision and Pattern Recognition. 2021. (Year: 2021).*

Petrovai et al. "Exploiting Pseudo Labels in a Self-Supervised Learning Framework for Improved Monocular Depth Estimation." 2022 IEEE/CVF Conference on Computer Vision and Pattern Recognition (CVPR). IEEE, 2022. (Year: 2022).*

Song et al. "Learning monocular depth estimation via selective distillation of stereo knowledge." arXiv preprint arXiv:2205.08668 (2022). (Year: 2022).*

Wu et al. "The Constraints between Edge Depth and Uncertainty for Monocular Depth Estimation." Electronics 10.24 (2021): 3153. (Year: 2021).*

* cited by examiner

700
MSFF: Multi-Scale Feature Fusion
⊕ : Elementwise Addition
: 1x1 Convolution
: Residual Block
: DCNv2
730
732
R | T (Semantic)
R | T (Instance)
708
706
Source Frame $I_{t-1}$
Source Frame $I_t$
Feature Extractor
734
MSFF
736
Warping
738
$L_1$ Distance
740
Cost Volume
742
744
Absolute Depth
746
$L_{Contrastive}$
728
Panoptic Segmentation
702
Panoptic Decoder
714
712
710'
710
716
718
720
722
x2
x8
x4
726
Sep-Decoder
724
Mask, Class

AUTOMATIC MONOCULAR DEPTH PERCEPTION CALIBRATION FOR CAMERA

TECHNICAL FIELD

This invention relates to methods and systems for estimating a depth of objects within an image and configuring camera systems to estimate the depth through self-supervised processing of video.

BACKGROUND

Monocular depth estimation (MDE) holds paramount significance across various domains, encompassing autonomous vehicles, mobile robotics, and aerial systems. At the forefront of current advancements, convolutional neural networks (CNNs) have propelled the field, operating within the confines of supervised learning paradigms. These networks learn the intricate mapping between input images and corresponding high-density ground truth. However, generating such ground truth for training and evaluation remains unfeasible due to cost constraints, labor-intensive annotations, and scene dynamics that lead to occlusion errors when aggregating LIDAR-derived point clouds, for example. To circumvent such limitations, self-supervised learning emerges as a cost-effective alternative for training MDE networks, harnessing scene geometry as a guiding principle. This approach intertwines the joint estimation of depth and motion during training, then reconstructs original frames using the derived estimates. Photometric loss comes to the fore, compelling the alignment of reconstructed frames with their originals, constituting the supervisory beacon for network training. Despite its scalability to novel scenes, such self-supervised strategies inadvertently introduce scale ambiguity in depth estimation, curtailing their broader application. Additionally, the adoption of photometric loss presupposes a static world, a premise violated by dynamic objects, consequently destabilizing the training process. These multifaceted challenges beckon innovative solutions to enhance the accuracy and applicability of self-supervised MDE frameworks.

Efforts to surmount these inherent limitations have led to many advancements, specifically directed at enhancing the performance of self-supervised monocular depth estimation algorithms. To ensure the static world assumption holds, several strategies have emerged, encompassing the utilization of semantic segmentation, auto-masking, and optical flow techniques. Moreover, for obtaining absolute depth, a variety of approaches have surfaced, with temporally aligned images being seamlessly integrated into frameworks such as the multi-view geometry paradigm, generating cost-volumes, or adopting structure-from-motion (SfM) methodologies. These endeavors have also incorporated supplementary information, including automobile velocity, GPS location, and IMU measurements. Despite the collective progress, challenges persist, notably, the performance shortfall of MDE in edge-rich regions, coupled with the delivery of scale-ambiguous depth, all within the constraints of a computationally efficient framework. These intricacies underscore the ongoing pursuit of innovative solutions to address these nuanced shortcomings and redefine state-of-the-art MDE techniques.

In the vehicle context, single-frame monocular depth estimation may be preferable given real-time resource constraints. Monocular depth estimation is an ill-posed problem as multiple mappings exist from 3D points to pixels within an image. Supervised learning-based approaches overcame this by learning the mapping between an input image and output depth map. However, the requirement of a high-quality depth map for paired training is undesirable for fine-tuning on new domains.

There is a needed a solution that addresses the above-mentioned shortcomings.

SUMMARY

According to one aspect of the disclosure, there is provided a method of estimating a depth of an object within an image. The method includes: obtaining single-frame image data; obtaining scaling factor data based on the single-frame image data; generating scale-invariant depth data through inputting the single-frame image data into a depth estimation network; and generating metric depth data based on the scaling factor data and the scale-invariant depth data.

According to various embodiments, the method may further include any one of the following features or any technically-feasible combination of some or all of the features:

- generating panoptic segmentation data using panoptic segmentation of the single-frame image data, wherein the panoptic segmentation data is used for generating the metric depth data;
- the panoptic segmentation is performed using a panoptic decoder that takes, as input, feature data generated by a feature encoder;
- the feature data is multi-feature fusion data that is or is derived from feature data from two different layers within the feature encoder;
- the scaling factor data is generated using a scaling factor network that is trained as a part of a student network that further includes the depth estimation network;
- the scaling factor network is trained by a teacher network based on loss calculated using metric depth data generated by the teacher network and scale-invariant depth data generated by the depth estimation network; and/or
- the scale-invariant depth data of the student network is combined with data output by the scaling factor network in order to generate metric depth data for the student network, and wherein the loss is calculated based on the metric depth data for the student network and the metric depth information of the teacher network.

According to another aspect of the disclosure, there is provided a method of training a depth estimation network. The method includes: inputting image data into a teacher machine learning (ML) model in order to generate metric depth data; inputting image data into a student ML model in order to generate scale-invariant depth data; and training a student network based on loss calculated using the metric depth data and the scale-invariant depth data.

According to various embodiments, the method may further include any one of the following features or any technically-feasible combination of some or all of the features:

- student network includes a depth decoder that is used to generate the scale-invariant depth data and a scaling factor network that generates scaling factor data that, when combined with the scale-invariant depth data, results in metric depth data of the student network;
- the metric depth data of the student network is compared with the scale-aware depth data of the teacher network in order to determine the loss;

- the image data input into the teacher ML model is multi-frame image data, and wherein the image data input into the student model is single-frame image data;
- the multi-frame image data includes the single-frame image data such that a frame of the multi-frame image data is a frame represented by the single-frame image data;
- the teacher network is trained using a training process that includes determining pose information and/or determining panoptic segmentation data for the multi-frame image data;
- the teacher network determines a cost volume between two frames of the multi-frame image data in order to generate the metric depth data; and/or
- the two frames of the multi-frame image data are temporally-adjacent.

According to yet another aspect of the disclosure, there is provided an image-based depth estimation system. The image-based depth estimation system includes an image sensor configured to capture images; at least one processor; and memory storing computer instructions. The computer instructions, when executed by the at least one processor, cause the image-based depth estimation system to: obtain single-frame image data; obtain scaling factor data based on the single-frame image data; generate scale-invariant depth data through inputting the single-frame image data into a depth estimation network; and generate metric depth data based on the scaling factor data and the scale-invariant depth data.

According to various embodiments, the image-based depth estimation system may further include any one of the following features or any technically-feasible combination of some or all of the features:

- the scaling factor data is generated using a scaling factor network that is trained as a part of a student network that further includes the depth estimation network;
- the scaling factor network is trained by a teacher network based on loss calculated using metric depth data generated by the teacher network and scale-invariant depth data generated by the depth estimation network;
- the scale-invariant depth data of the student network is combined with data output by the scaling factor network in order to generate metric depth data for the student network, and wherein the loss is calculated based on the metric depth data for the student network and the metric depth information of the teacher network; and/or
- the image-based depth estimation system is incorporated into an onboard vehicle computer system.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

A system and method is provided for monocular metric depth estimation based on image data, including embodiments directed toward training a multi-frame absolute depth teacher model and then performing knowledge distillation, whereby a single-frame-based student model learns scaling factor information used to enable the single-frame-based student model to provide metric depth (or absolute depth) estimations rather than simply scale-invariant depth estimations. The framework provided herein may also be used to obtain camera parameters, such as one or more of lens distortion coefficient(s), focal length, principal point, pixel aspect ratio, and skew coefficient, for example.

A monocular metric depth estimation model is trained and then, once sufficiently trained, is used for inference for purposes of real-time single-frame monocular depth estimation, for example. In embodiments, the trained monocular metric depth estimation model is used for determining metric distances of detected objects within image data representing an image of a scene. For example, real-time inference of the trained monocular metric depth estimation model is performed by an onboard vehicle computer system and the outputted depth information or depth data is used for various purposes, such as for informing autonomous operations of the vehicle.

According to embodiments, there is provided a multi-stage process for training the monocular metric depth estimation model. In a first stage, calibration parameters of the camera are determined. In a second stage, metric depth estimation is performed using two temporally-adjacent images and the camera parameters. In a third stage, a student model is trained with the multi-frame depth estimation model from stage 2 being used for supervision, resulting in learning a scaling factor (or scaling factor data). This learned scaling factor is usable by the student model, which is a single-frame depth estimation model, in order to estimate a metric depth rather than merely a scale-invariant depth.

Figure 1:
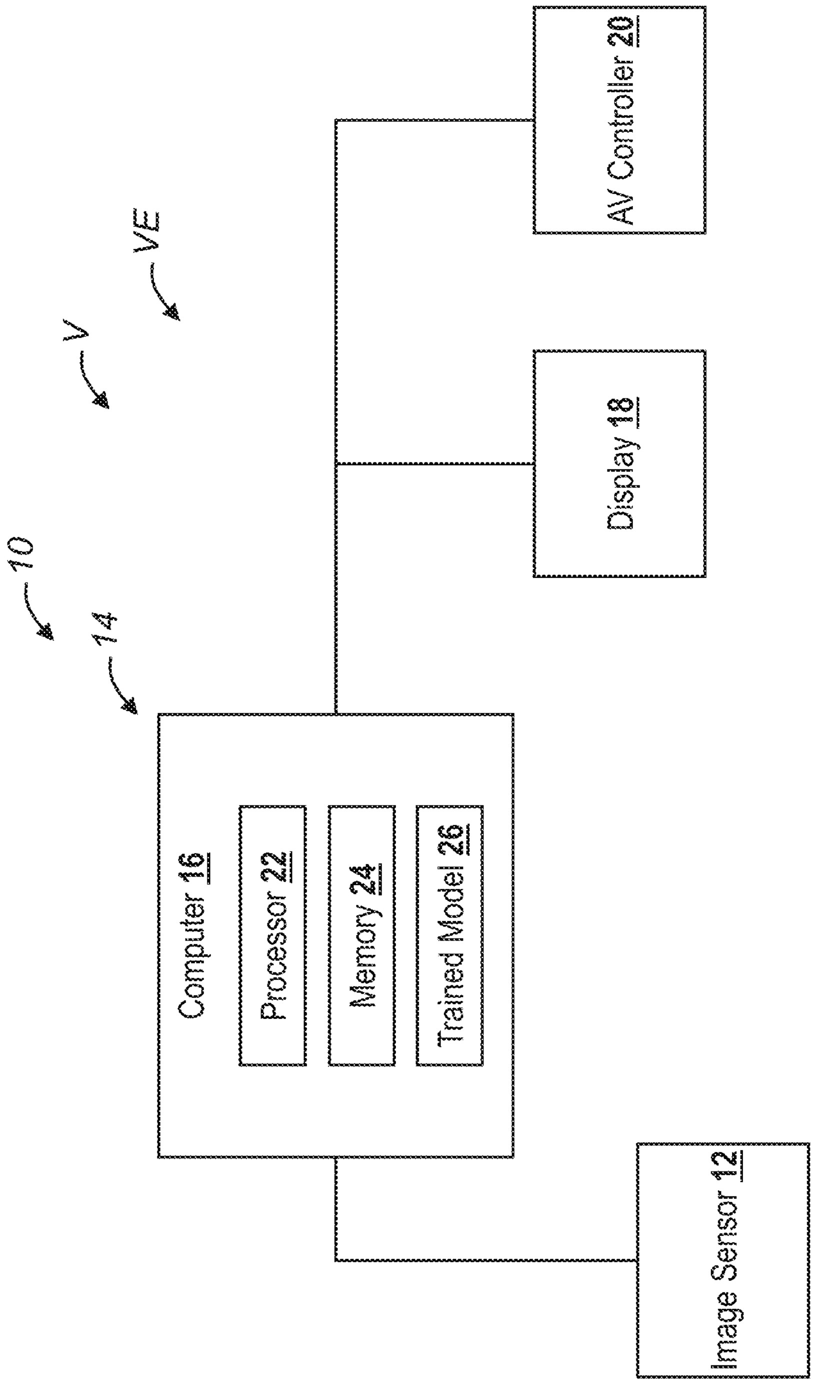
FIG. 1 is a block diagram illustrating an image-based depth estimation system, according to one embodiment.

With reference to FIG. 1, there is shown an image-based depth estimation system 10 for a vehicle V having an image sensor (e.g., camera or other visible light sensor) 12, a processing subsystem 14 having at least one computer 16, a display 18, and an autonomous vehicle (AV) controller 20. Here, "image-based", when used in connection with depth estimation, refers to depth estimation performed using visible light images captured by a camera or other visible light sensor. The image-based depth estimation system 10 is incorporated into vehicle electronics VE of the vehicle V, as shown in FIG. 1. However, in other embodiments, the image-based depth estimation system 10 may be incorporated into another device, component, or system, such as a non-automotive or non-vehicular system, for example, in a smartphone. The display 18 and the AV controller 20 receive enhanced image data from the processing subsystem 14, but need not be included in other embodiments, and may be excluded or replaced with other components to which enhanced image data is provided.

The image sensor 12 is a sensor that captures light (namely, visible light in the present embodiment) represented as an array of pixels that together constitute a light image or a visible light image in the present embodiment, which may be represented as RGB data, for example. According to embodiments, the image sensor 12 is a digital camera, such as one employing a CMOS (Complementary Metal-Oxide-Semiconductor) sensor, CCD (Charge-Coupled Device) sensor, and Foveon sensor, and is used to generate RAW sensor data that is passed to an ISP pipeline for processing, such as the one discussed herein.

The image sensor 12 captures visible light images representing a scene as viewed from the sensor's point of view. More particularly, the image sensor 12 receives light, which is then converted from its analog representation to a digital representation. Various processing techniques may be used to prepare the visible light image for downstream processing, including, for example, demosaicing, color space conversion, and other image processing techniques, such as image enhancement techniques (e.g., color balance, exposure, sharpness). Such processing results in the captured light represented as a visible light image in a visible light color space, such as standard RGB (sRGB) or Adobe™ RGB, for example.

The processing subsystem 14 is for processing images captured by the image sensor 12 in order to determine depth information regarding objects depicted/represented within the images, such as for determining a metric depth between the vehicle V and an object on the road. The processing subsystem 14 is configured to perform the method discussed herein. The processing subsystem 14 includes the at least one computer 16. In FIG. 1, the at least one computer 16 is illustrated as a single computer; however, it will be appreciated that multiple computers may be used as the at least one computer 16, together configured to perform the method and any other functionality attributed to the processing subsystem 14, as described herein. Each of the at least one computer 16 includes the at least one processor 22 and memory 24, with the memory 24 storing the computer instructions for execution by the at least one processor 22. It will also be appreciated that the computer instructions may be stored on different physical memory devices and/or executed by different processors or computers of the processing subsystem 14, together causing performance of the method and attributed functionality discussed herein.

In one embodiment, the at least one processor 22 includes a central processing unit (CPU) and a graphics processing unit (GPU) (or even a tensor processing unit (TPU)), each of which is used to perform different functionality of the processing subsystem 14. For example, the GPU is used for inference of neural networks (or any like machine learning models) as well as for any training, such as online training carried out for adaptable learning carried out after initial deployment; on the other hand, other functionality attributed to the processing subsystem 14 is performed by the CPU. Of course, this is but one example of an implementation for the at least one computer 16, as those skilled in the art will appreciate that other hardware devices and configurations may be used, oftentimes depending on the particular application in which the at least one computer 16 is used.

The at least one computer 16 is shown as including a trained depth estimation pipeline (also referred to as a trained inference model) 26, which is stored as computer instructions on the memory 24 and executed by the processor 22. The trained ISP pipeline or trained inference model 26 that process an input image in order to determine depth information. The trained inference model 26 may include an inference encoder and an inference decoder, each having a plurality of convolutional layers forming a CNN. The trained inference model 26 may be trained using a training subsystem (not shown) having one or more computers. In embodiments, knowledge distillation is performed whereby the inference encoder, acting in a role here as a student, learns or is otherwise imparted knowledge learned by a teacher encoder through a multi-frame supervisory feature distillation training process.

Figure 2:
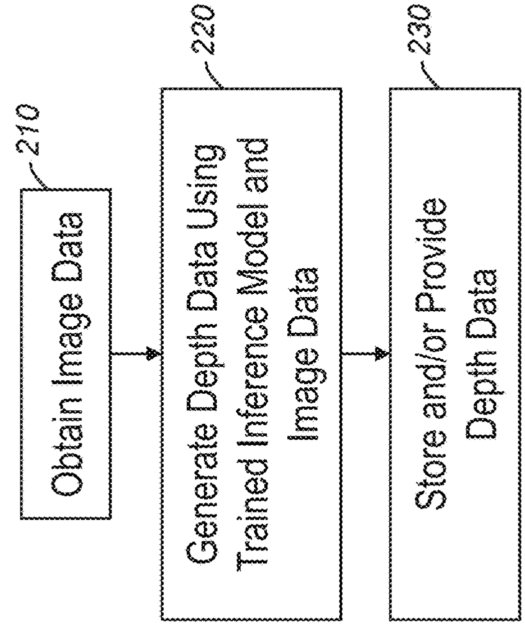
FIG. 2 is a flowchart illustrating a method of estimating a depth of an object within an image, according to one embodiment.

With reference to FIG. 2, there is shown a method 200 of estimating a depth of an object within an image. The method 200 is performed by the image-based depth estimation system 10, according to one embodiment.

The method 200 begins with step 210, wherein image data is obtained. The image data is captured using the image sensor 12. In embodiments, the image data obtained here is single-frame image data, which is image data representing a single frame. The image sensor 12 may continuously capture visible light images that are then processed and/or stored in memory of the system 10. The image sensor 12 captures visible light information of a scene within the FOV of the visible light sensor 12. The image sensor is obtained at the computer 16 and may be processed using various techniques, such as image enhancement techniques. The method 200 continues to step 220.

In step 220, inference is performed using a trained machine learning (ML) model in order to generate depth data, which may provide a metric depth of one or more objects within the image. For example, the trained inference model 26 is used to perform inference in order to generate the depth data. In embodiments, the ML model is a convolutional neural network (CNN) that includes a plurality of convolutional layers and, in embodiments, includes a plurality of convolutional encoder layers constituting an inference encoder and a plurality of convolutional layers forming an inference decoder that takes, as input, latent feature data generated by the inference encoder. The image data, which may represent an entire visible light image captured by a camera, is input into the CNN in order to begin inference, which results in the inference decoder generating enhanced image data representing an enhanced image. An example of training a ML model for single-frame monocular depth estimation and its related components are discussed below. The method 200 continues to step 230.

In step 230, the depth data is stored in memory and/or communicated or otherwise provided to another computer or other electronic device, such as the display 18 or the AV controller 20. In embodiments, the depth data is stored the memory 24 and/or another memory of the vehicle electronics VE. In some embodiments, the method 200 is performed continuously, such as through capturing image data and, in real-time, processing the captured image data in order to generate depth data for the captured images. The depth data may be displayed on the display 18 for viewing by the driver or other passenger, or may be continuously used for autonomous processing (e.g., for determining autonomous maneuvers) by the AV controller 20, for example. The method 200 then ends.

Figure 3:
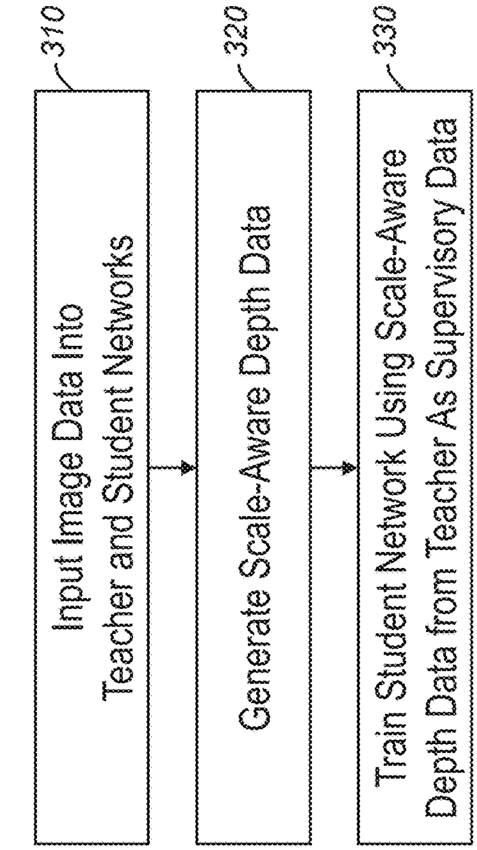
FIG. 3 is a flowchart illustrating a method of training an inference model for depth estimation, according to one embodiment.

With reference to FIG. 3, there is shown a method 300 of training an inference model for depth estimation and, more particularly, training the inference model through use of a teacher model that supervises outputs of the inference model during training.

Figure 4:
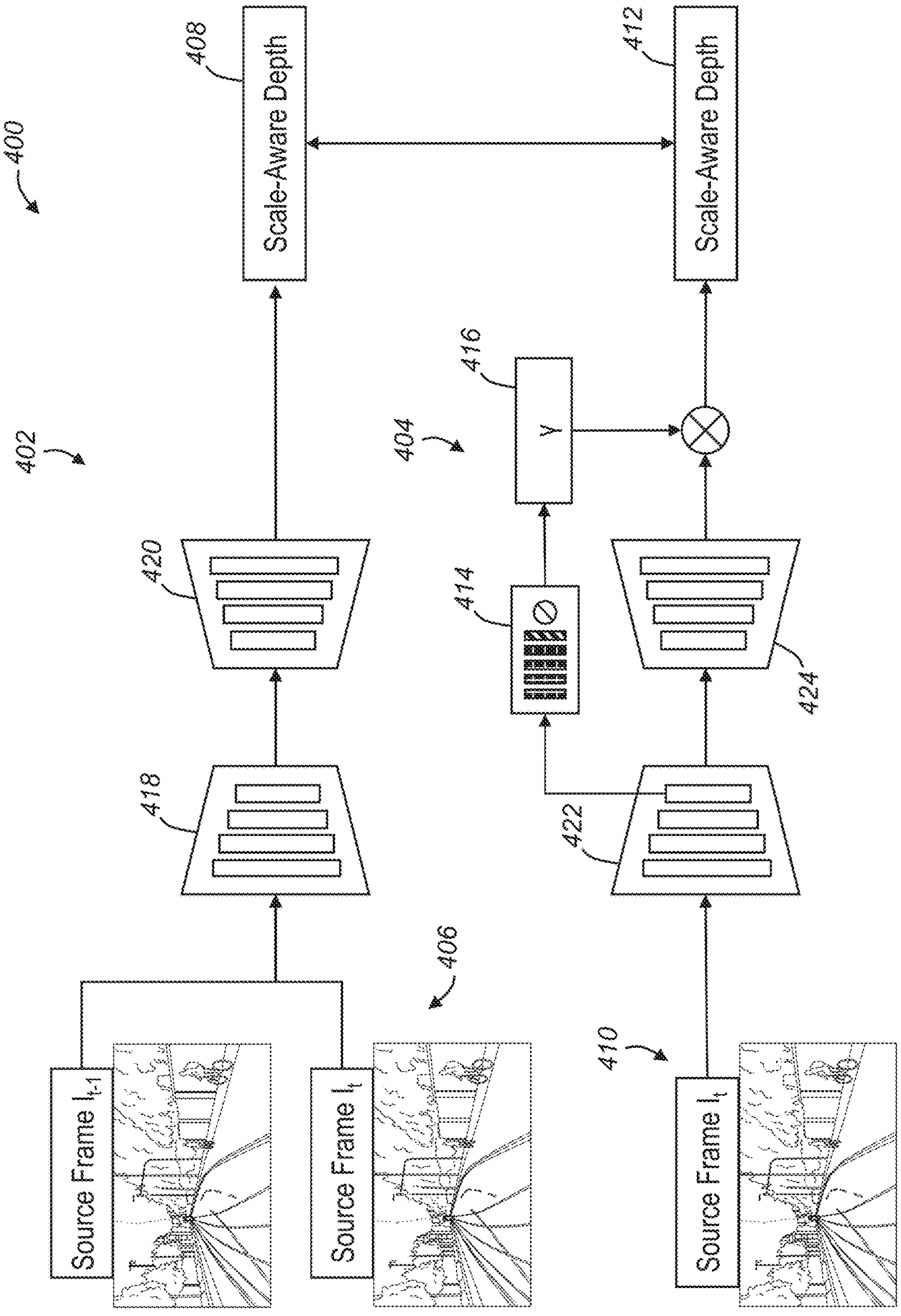
FIG. 4 is a block diagram depicting a training system and network that is used to train an inference model for depth estimation, according to embodiment.

With reference to FIG. 4, and continued reference to FIG. 3, there is shown an embodiment of a training system and network 400, which is used to perform the method 300, according to the present embodiment. The training network 400 includes a teacher network 402 and a student network 404. The teacher network 402 processes image data for multiple temporally-adjacent frames 406 captured by a camera and generates scale-aware or metric depth data 408, and this data 408 may specifically be referred to as teacher scale-aware depth data as the depth data here is generated by the teacher network 402.

The teacher scale-aware depth data 408 is used for supervising outputs of the student network 404. More particularly, the student network 404 is configured to process image data for a single frame 410 in order to generate scale-aware depth data 412, and this data 412 may specifically be referred to as student scale-aware depth data as the depth data here is generated by the student network 404. The student network 404 is trained using backpropagation based on differences between the teacher scale-aware depth data 410 and the student scale-aware depth data 412. In the present embodiment, the student network 404 includes a scaling factor network 414 that is used to determine scaling factor data 416, such as a global scaling factor or a scaling factor array, where entries in the array correspond to pixels or regions of pixels. The scaling factor network 414 may be trained along with the other components of the student network 404, as discussed below. The student network 404 implements a single-frame monocular depth estimation pipeline that uses a CNN to generate scale-invariant depth data, which is then combined, via elementwise multiplication as shown in FIG. 4, for example, with the global scaling factor data 416 output by the scaling factor network 414 in order to generate the scale-aware depth data 412.

Exemplary embodiments of the teacher network 402 and the student network 404 are discussed below. In at least some embodiments, the teacher network 402 includes a teacher encoder 418 and a teacher decoder 420, and the student network 404 includes a student encoder 422 and a student decoder 424. These encoders 418, 422 and decoders 420, 424 may each include a plurality of convolutional layers, each employing one or more convolution filters/operators.

The method 300 begins with inputting multi-frame image data into the teacher network 402 and single-frame image data into the student network 404. The multi-frame image data corresponds to the image data 406 and is image data representing two images, which are temporally adjacent to one another in terms of capture time. The single-frame image data corresponds to the image data 410 and is image data representing only a single frame or image. In embodiments, the image data 410 corresponds to image data 412 for one of the frames/images so that the same image is input into both the teacher network 402 and the student network 404. The method 300 continues to step 320.

In step 320, scale-aware depth data for the teacher network is obtained as a result of inference being performed by the teacher network on the multi-frame image data, and scale-aware depth data for the student network is obtained as a result of inference being performed by the student network on the single-frame image data. For example, the teacher network 402 generates the teacher scale-aware depth data 408 and the student network 404 generates the student scale-aware depth data 412. The method 300 continues to step 330.

In step 330, training the student network using the scale-aware depth data generated by the teacher network as supervisory data. The student network learns to mimic the teacher network's output through a process called knowledge distillation. The student network's parameters are adjusted to minimize the difference between its own outputs and the teacher network's outputs. The scaling factor network 414 within the student network 404 aids in adapting to varying depth scales, ensuring the student network 404 is able to generate depth maps similar to the teacher network 402. This method efficiently trains simpler networks to generate high-quality depth maps, beneficial in applications with limited computational resources. The method 300 ends.

Figure 5:
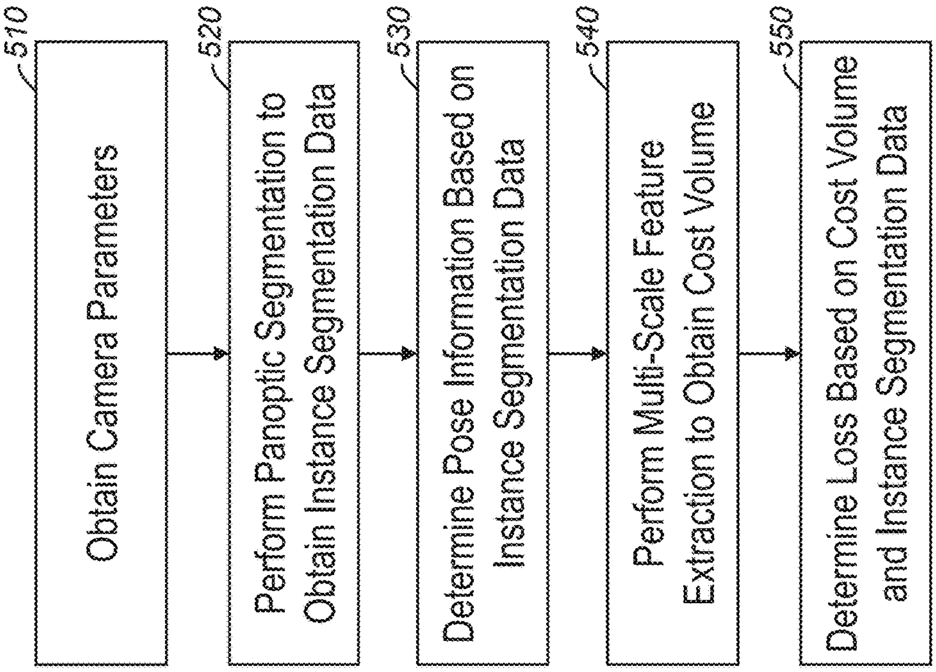
FIG. 5 is a flowchart illustrating a method of training a ML model for multi-frame depth estimation, according to one embodiment.

With reference to FIG. 5, there is shown a method 500 of training a ML model for multi-frame depth estimation, such as for training the teacher network 402. The method 500 is described with reference to FIGS. 6-9, which depicts an exemplary training pipeline and its components used for training the multi-frame teacher network 402, according to one embodiment.

Figure 6:
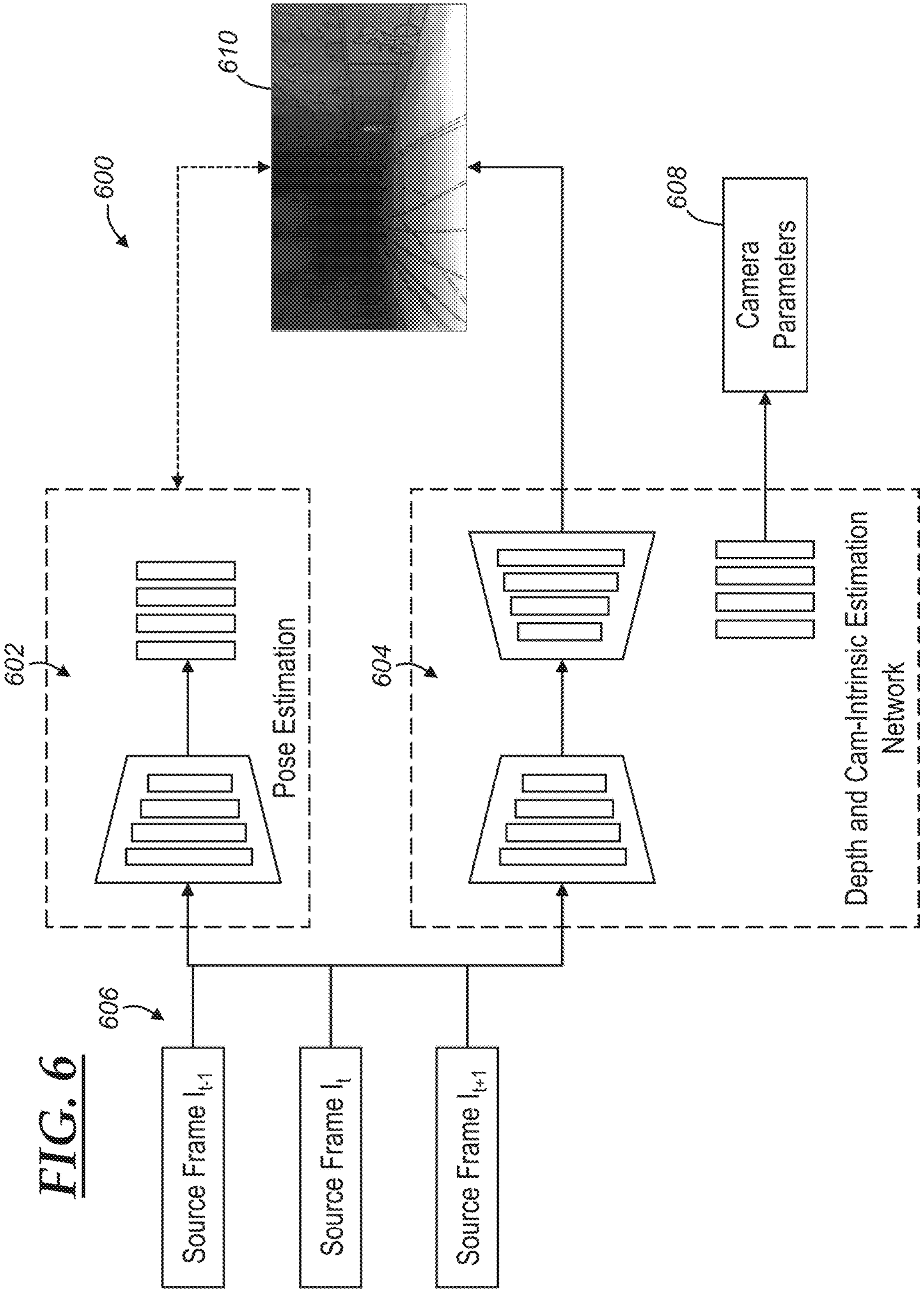
FIG. 6 is a block diagram depicting a camera parameter and pose estimation pipeline or system, including a pose estimation network and a camera parameter estimation network, according to one embodiment.

With particular reference to FIG. 6, there is shown a camera parameter and pose estimation pipeline or system 600, having a pose estimation network 602 and a camera parameter estimation network 604. The pose estimation network 602 estimates pose information for image data input into the network 602, which may be three temporally-adjacent source images 606, such as is shown in the embodiment of FIG. 6. The pose information is used for ensuring consistent relative depth. The camera parameter estimation network 604 is used to obtain camera parameters 608 based on the input source images 606, and also generates depth information 610, which is used for learning the camera parameters 608 through enforcing depth estimation consistency across temporally-adjacent frames. The camera parameters 608 may include a variety of parameters, including lens distortion coefficient(s), focal length, principal point, pixel aspect ratio, and skew coefficient, for example. With reference back to FIG. 5, the method 500 continues to step 520.

In step 520, panoptic segmentation is performed on image data in order to obtain instance segmentation data. Panoptic segmentation is a computer vision task that simultaneously performs semantic segmentation, classifying each pixel into a category, and instance segmentation, distinguishing between different instances of the same category, resulting in an output that assigns a unique label to each pixel, indicating both its category and instance identity.

Previous methods have tried to improve depth estimation by incorporating semantic segmentation using a shared encoder. However, these methods failed to differentiate between occluded objects of the same category, leading to depth consistency across objects, regardless of their true depth values. To address this, an approach that includes a panoptic segmentation branch is proposed as this helps to more accurately identify edge details and effectively distinguish between occluded objects of the same classes. The You Only Segment Once (YOSO) approach may be adopted for efficient use of resources and computation. This approach synergizes instance and semantic segmentation by learning a kernel that discriminates unique objects or semantic categories.

Figure 7:
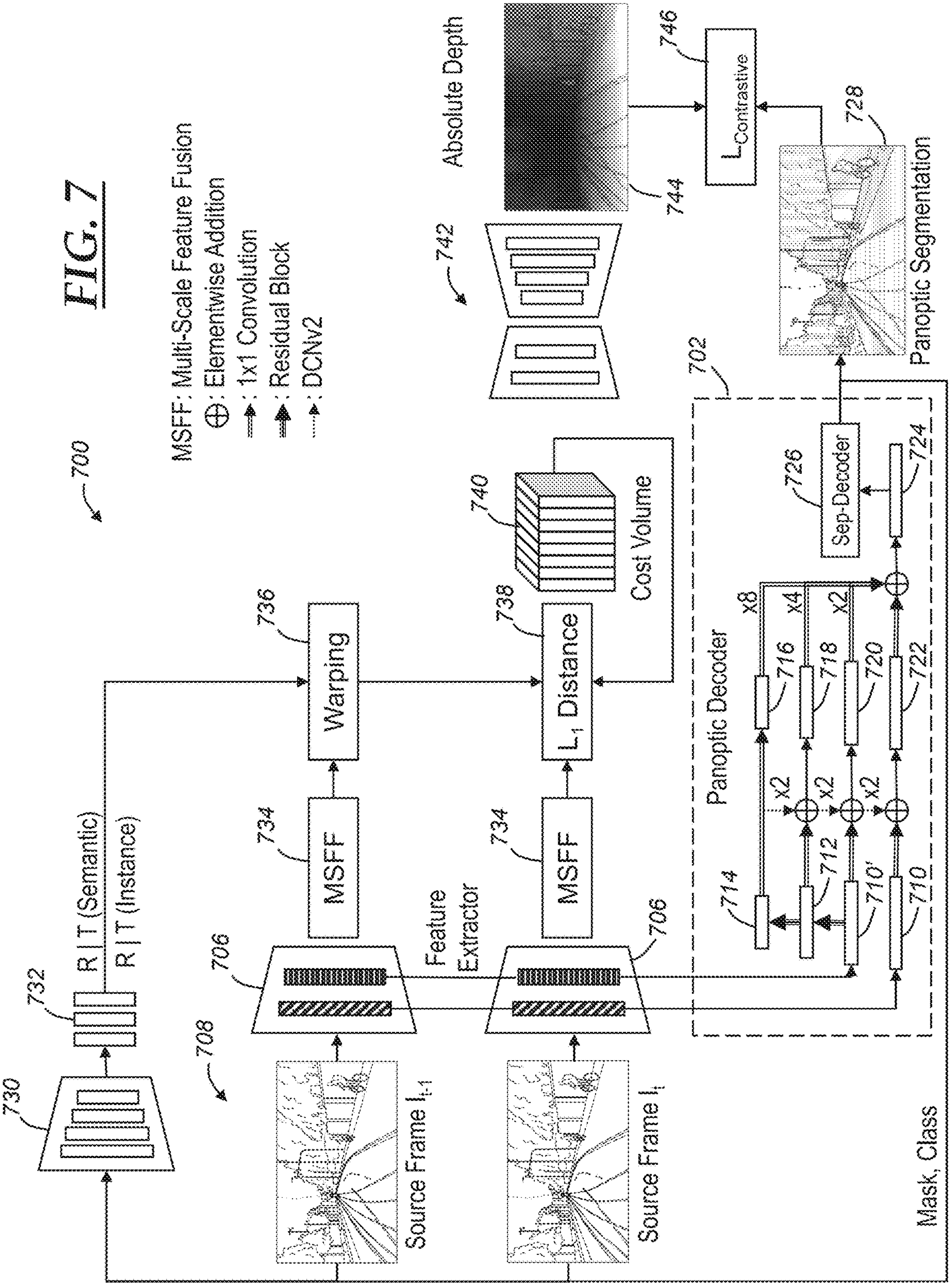
FIG. 7 is a block diagram depicting a multi-frame depth estimation framework, according to one.

With reference to FIG. 7, there is shown a multi-frame depth estimation framework 700, including a panoptic decoder 702, which is used for determining panoptic segmentation data 704. The panoptic decoder 702 uses multi-scale features from a multi-scale feature extractor network 706, which operates to extract multi-scale feature data from two temporally-adjacent source image frames 708. Particularly, multi-scale feature data 710, 710' is used as input into the panoptic decoder 702. The multi-scale feature data 710' is processed using a first residual block and a second residual block to obtain intermediate data 712, 714. Said second intermediate data 714 is processed using a 1×1 convolution to obtain other intermediate result data 716. The first intermediate results 712 has a 1×1 convolution performed and is then combined, via elementwise addition, with output of DCNv2 processing, as shown by the arrow with a dotted line, which is performed on the second intermediate data 714. This results in intermediate data 718. This output may further be processed using DCNv2 processing and the output of this DCNv2 processing combined with output of a 1×1 convolution of the multi-scale data 710' to generate intermediate data 720. Again, this output may further be processed using DCNv2 processing and the output of this DCNv2 processing combined with output of a 1×1 convolution of the multi-scale data 710 to generate intermediate data 722. Various 1×1 convolutions are then performed in order to suitable scale the intermediate data 7126-722 to a common size or shape. The outputs of these convolutions are all combined using elementwise addition, as shown in FIG. 7, and this results in panoptic latent data 724, which is then input into a decoder 726, which then generates a panoptic segmentation output represented as panoptic segmentation data 728. The illustrated embodiment of the panoptic decoder 702 is but one embodiment, as other variations of the panoptic decoder 702 are possible and may be configured suitably for the application in which the decoder is to be used.

With reference back to FIG. 5, the method 500 proceeds to step 530. In step 530, pose information is determined based on the panoptic segmentation data, which is also considered instance segmentation data as the segmentation data indicates separate instances, even within the same class. With reference to FIG. 7, the pose information is determined using a pose estimation network 730, which generates rotation and translation values for the identified, segmented object as the output pose information 732.

Prior approaches in self-supervised depth estimation have commonly adopted an approach of masking out dynamic objects during training to ensure consistent warping. However, this strategy inadvertently excludes dynamic objects from the optimization process, thereby deviating from the desired goal of accounting for their presence. The proposed approach of the present embodiment undertakes a comprehensive rethinking of the global scene pose estimation pipeline to rectify this limitation. This solution involves instance-specific pose estimation, which is made feasible by integrating panoptic labels of the panoptic segmentation data 728. By utilizing panoptic segmentation information for two consecutive frames, a matching process grounded in the mean Intersection over Union (mIoU) metric is initiated, and objects with pixel counts below a predefined threshold ($\alpha$%) of the image resolution) are excluded from consideration, as they typically correspond to distant objects prone to pose estimation errors. Accordingly, by incorporating panoptic segmentation data into the process, depth estimation around edges of objects, especially distant and/or moving objects, is improved.

The scene's global dynamics encompass both static and dynamic objects. The static elements encapsulate classes categorized as stuff, such as road, sidewalk, building, wall, fence, pole, traffic light, traffic sign, vegetation, terrain, and sky. In contrast, dynamic objects pertain to things categories, such as person, rider, car, truck, bus, train, motorcycle, and bicycle. As such, the overall scene dynamics can be represented as a fusion of global poses for static objects and instance-wise poses for dynamic elements. This piece-wise approach for capturing global scene translation can be seamlessly integrated into prevailing self-supervised depth estimation models, enabling their application in dynamic scenes without the need for masking. To facilitate this formulation and its self-supervised training, stuff labels are utilized to establish binary masks for objects sharing the same pose. Consequently, in a pair of temporally adjacent frames, a pose estimation network is employed, with the masked static scene as input, to deduce a global pose. Similarly, instance-wise pose estimation is computed employing the masked instance image. With global and instance-wise pose estimations at hand, standard self-supervised practices for forward and backward warping are applied. The comprehensive framework is summarized in FIG. 8.

Figure 8:
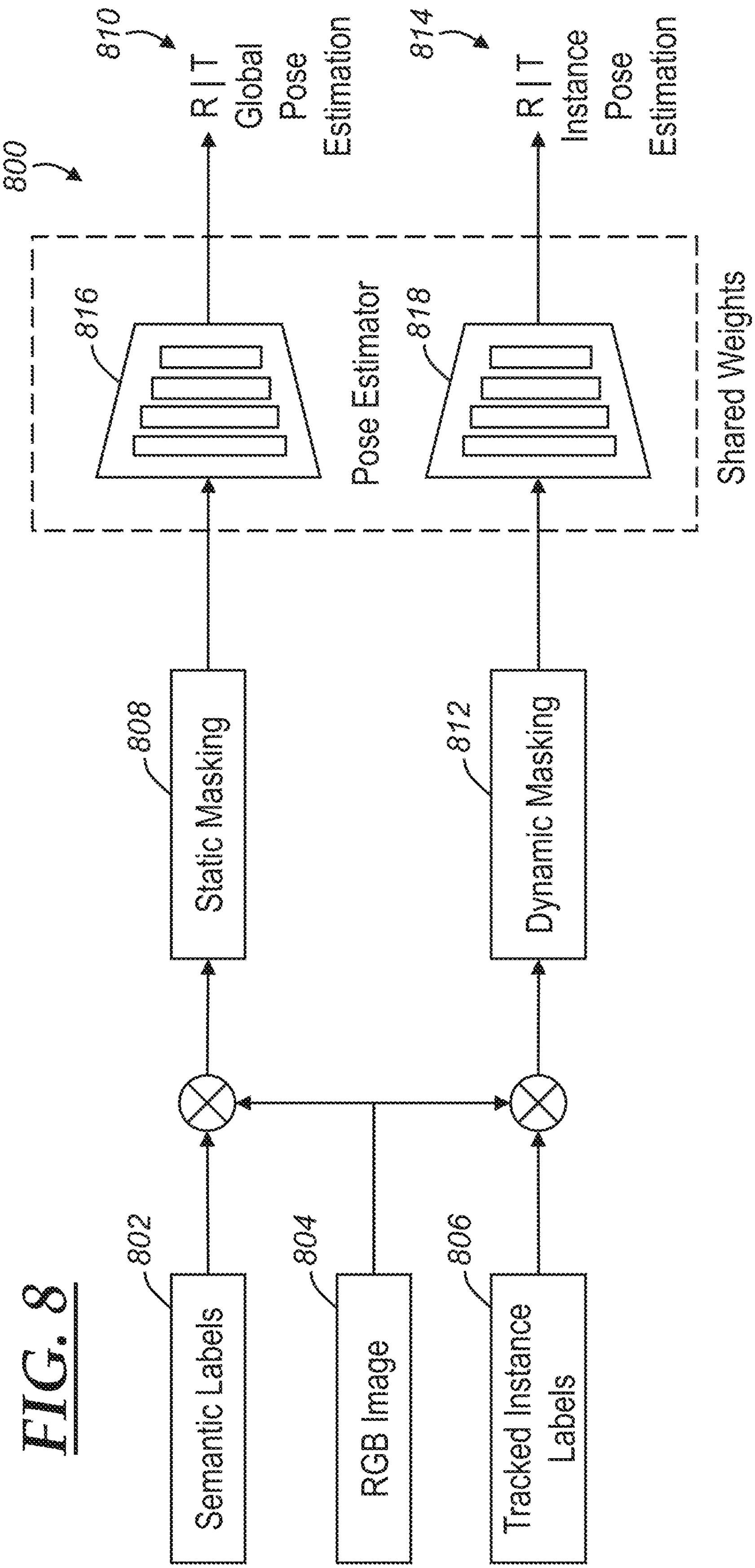
FIG. 8 is a block diagram depicting a piecewise pose estimation network, which may be used as part of the multi-frame depth estimation framework of FIG. 7, according to one embodiment.

With reference to FIG. 8, there is shown a piecewise pose estimation network 800, which uses semantic labels 802, an RGB image 804, and tracked instance labels 806 in order to generates inputs used for global pose estimation and instance pose estimation. Static masking 808 is performed on inputs that are used to generate global pose estimation data 810, and dynamic masking 812 is performed on inputs that are used to generate instance pose estimation data 814. The global pose estimation data 810 is generated using a CNN-based encoder 816 and, likewise, the instance pose estimation data 814 is generated using a CNN-based encoder 818. In embodiments, the CNN-based encoders 816, 818 may be implemented using the same or similar CNN-based architectures.

Figure 9:
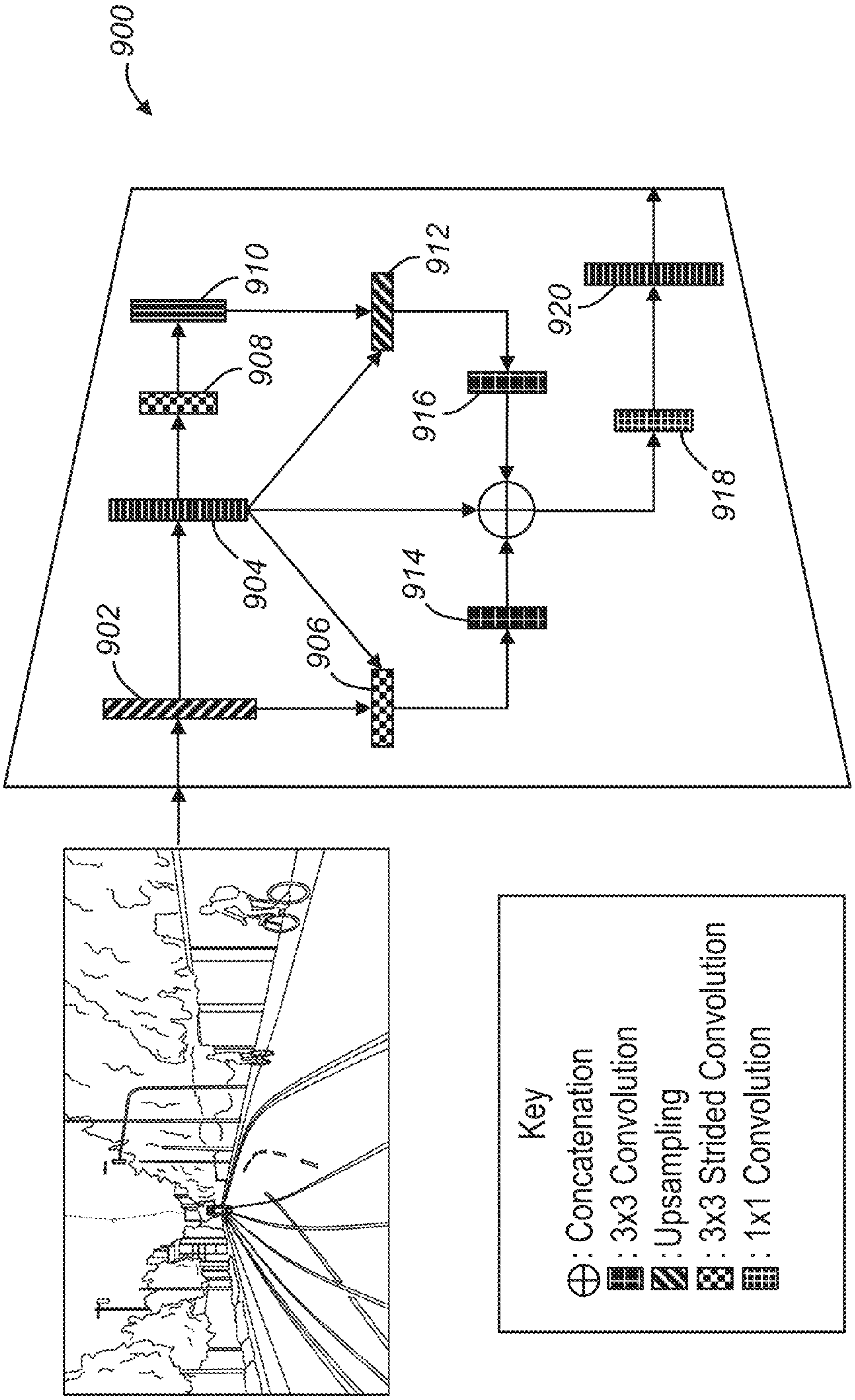
FIG. 9 is a block diagram illustrating a multi-scale feature fusion network, which may be used by the multi-frame depth estimation framework of FIG. 7, according to one embodiment.

With reference back to FIG. 5, the method 500 continues to step 540. In step 540, multi-scale feature extraction is performed in order to obtain a cost volume. In the context of utilizing temporally-adjacent frames for image projection in feature matching, it becomes evident that the scale of objects can undergo significant changes. This phenomenon arises due to camera motion, introducing variations in object dimensions. Conventional convolutional methods prove inadequate in capturing and representing such intricate scale variations, leading to suboptimal results. To address this challenge, there is provided a multi-scale feature fusion mechanism. This multi-scale feature fusion mechanism is designed to incorporate a range of multiscale features into the feature representation process, a crucial step utilized for both feature matching and cost volume computation. FIG. 7 depicts two multi-scale feature fusion (MSFF) blocks 734, which are used to process a given source frame. FIG. 9 depicts an overview of the proposed multi-scale feature fusion for improving the feature representation quality for performing multi-frame depth estimation, according to one embodiment.

With reference to FIG. 9, there is shown a multi-scale feature fusion network 900, which may be used for implementing the MSFF blocks 734. The multi-scale feature fusion network 900 is shown as having a first layer 902 and a second layer 904, whereby a 3×3 strided convolution is performed at 906 using layers 902, 904 and another 3×3 strided convolution is performed using the second layer 904 to yield third layer 910, which is then upsampled with the second layer 904. The result of this upsampling 912 and the result of the 3×3 strided convolution 906 then each has a 3×3 convolution performed at 916, 914, respectively, and the results of said convolutions 914, 916 are then combined with one another and the second layer 904 using elementwise addition, and the result of this concatenation is then used as input into a 1×1 convolution operation 918, in order to generate result 920, as shown in FIG. 9.

After multi-feature fusion data is generated using the MSFF blocks 734, warping 736 is performed using this multi-feature fusion data and the pose information 732. After the first multi-feature fusion data is appropriately or suitably warped, an L1 or Manhattan distance 738 is determined using this warped multi-feature fusion data and the multi-feature fusion data for the second source frame (here $I_t$). The L1 distance is used to determine the cost volume 740. With reference back to FIG. 5, the method 500 continues to step 550.

In step 550, loss is determined based on the cost volume and instance segmentation data. The cost volume using an L1 distance calculation is employed to determine a depth map. With reference to FIG. 7, this process uses a pair of stereo images 708, which capture the same scene from slightly different angles, in order to find the disparity between corresponding points in the images, representing a difference in position. A cost volume, often represented as a 3D data structure, is then created to store the dissimilarity between pixels in the left and right images. The L1 distance, also known as Manhattan distance, is calculated by comparing the intensity values of the pixels. The process of obtaining absolute depth from the cost volume calculation involves utilizing a neural network. Once the cost volume 740 is computed using the L1 distance, it serves as input into a neural network 742, which includes an encoder and a decoder, as shown in the depicted embodiment. This neural network 742 may use camera parameters and the cost volume data 740 to extract features, such as high-level features, from the cost volume and generates the absolute depth map. The encoder captures relevant patterns and structures, while the decoder part refines and upsamples the features to produce the depth map 744.

The metric depth data 744 and the panoptic segmentation data 728 are then used for determining contrastive loss 746, which may be determined accordingly, at least according to one embodiment. The motivation behind the triplet loss was re-evaluated with the availability of object instances within the scene. This motivation centers on ensuring the depth estimation network accurately detects edges, which becomes evident through depth discontinuities around object boundaries. Specifically, it has been observed that in occluded scenarios, the inability to distinguish foreground and background pixels effectively obscures boundaries, as the photometric loss equates background pixels with foreground due to shared disparity. Semantic maps may be used to enforce geometric constraints. This involves partitioning a given semantic label into K×K patches with a stride of 1. These centers of these patches serve as anchors, while same-class features function as positives and others as negatives. The triplet loss is employed to maximize the distance between anchor-positive (d+) and anchor-negative (d−) instances, governed by a margin (m).

Triplet loss is a loss function used in machine learning, particularly in tasks involving learning data representations. It involves three data pieces: an "anchor", a "positive" similar to the anchor, and a "negative" dissimilar to the anchor, with the goal generally being to make the anchor and positive representations closer than the anchor and negative ones. In depth estimation, triplet loss helps ensure that points close together in reality also have close depth estimates, while distant points have further apart estimates.

The distances are computed as the mean Euclidean difference of L2—normalized depth features. Despite its performance improvement, this triplet loss process has two drawbacks: equal weighting of all negative pixels and joint optimization of anchor-positive and anchor-negative samples, leading to sub-optimal results. To overcome these issues, panoptic masks are leveraged to introduce a supervised contrastive loss paradigm. Under this, pixels within the mask are classified as positives, while those outside the mask serve as negatives within the same patch. This approach supersedes the triplet loss and employs the supervised contrastive loss using L2 distance (·), denoted as:

$$L_{Contrastive} = \sum_{i \in I} \frac{-1}{|P(i)|} \sum_{p \in P(i)} \log \frac{\exp(z_i \cdot z_p/\tau)}{\sum_{n \in N(i)} \exp(z_i \cdot z_n/\tau)} \quad \text{Equation (1)}$$

Here, P(i) and N(i) refer to indices of positive and negative features, respectively, while $z_i$, $z_p$, and $z_n$ represent anchor, positive, and negative features. The temperature parameter $\tau$ is introduced to adjust the magnitude of distance computation. This improves the depth estimation process as learning, such as through backpropagation. The method 500 then ends.

Figure 10:
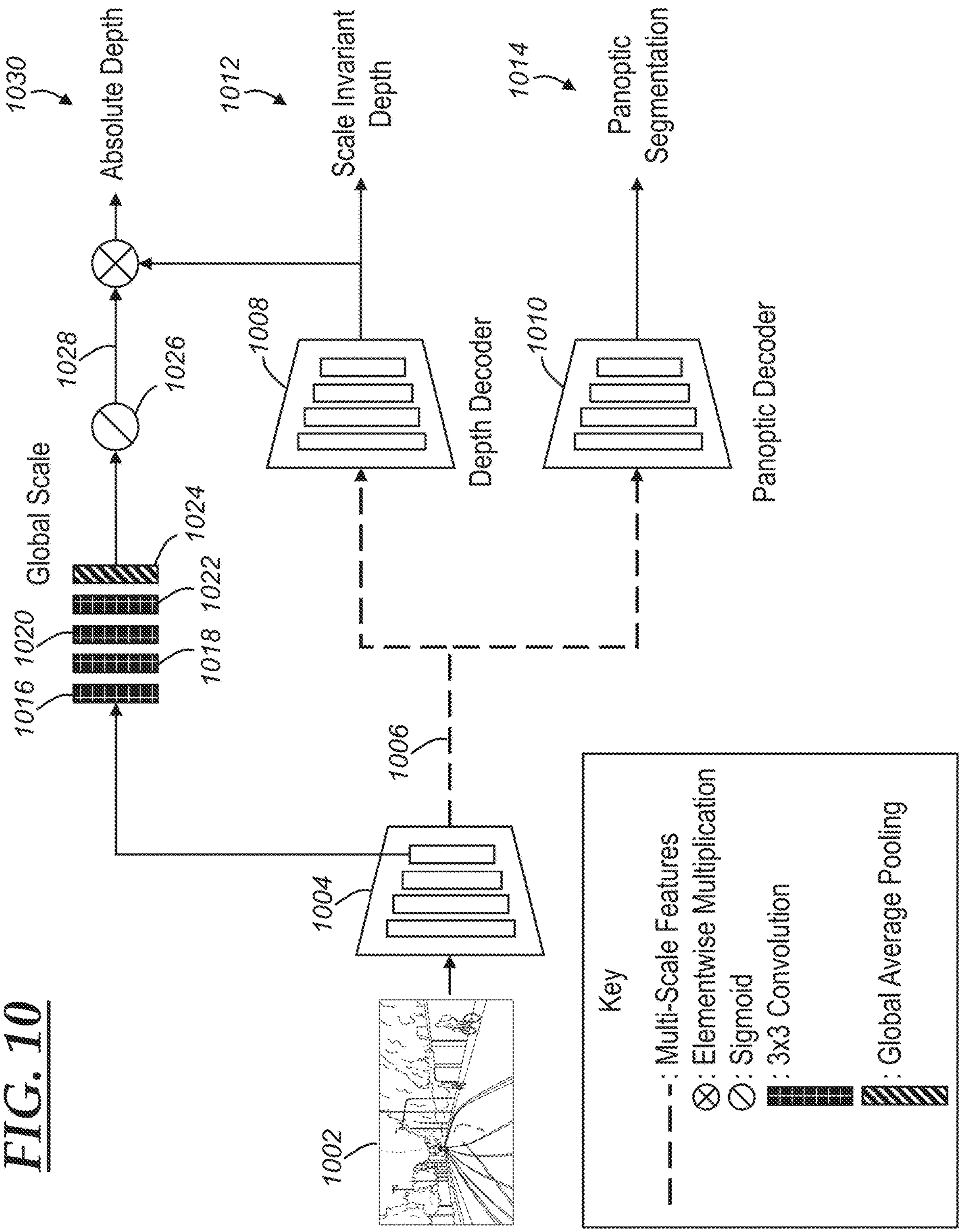
FIG. 10 is a block diagram illustrating a single-frame monocular depth estimation pipeline, according to one embodiment.

With reference to FIG. 10, there is shown a single-frame monocular depth estimation pipeline 1000, according to one embodiment. The single-frame monocular depth estimation pipeline 1000 may be used as the trained depth estimation pipeline 26. The single-frame monocular depth estimation pipeline 1000 begins with obtaining a source image or single-frame image data 1002, which represents only a single frame captured by the image sensor. The image data 1002 is then processed using a multi-scale feature network 1004 in order to generate multi-scale feature data 1006, which is then input into both a depth decoder 1008 and a panoptic decoder 1010. The depth decoder 1008 is used to generate scale-invariant depth data 1012, and the panoptic decoder 1010 is used to generate panoptic segmentation data 1014.

As mentioned, single-frame monocular depth estimation networks offer computational efficiency, yet their prediction of scale-invariant depth poses limitations on their utility. Prior methods attempted to address this limitation by estimating the scale factor through the computation of a median value, aligning the predicted depth with LiDAR-generated ground truth. However, this approach contradicts the essence of self-supervised learning. As an alternative, as disclosed herein, the benefits of multi-frame networks are leveraged to calculate absolute depth. This pseudo-absolute depth can then be harnessed to train a single global scale factor, effectively enabling the conversion of relative depth predictions to absolute depth using a single-frame MDE network. This is particularly relevant in the context of monocular videos, where a constant global scale factor can be assumed to provide absolute depth information. In light of this, the computation of depth scaling is embedded within the framework of the single-frame MDE architecture. This involves utilizing four 3×3 convolutional layers 1016-1022 on encoder-derived features, followed by a global average pooling layer 1024 and a sigmoid activation function 1026 in order to provide output scaling factor data 1028. The knowledge distillation framework discussed above with respect to FIG. 4, enforced via L1 loss, is used to leverage absolute depth generated by multi-frame MDE and infuse geometric constraints in form of global scaling factor in single-frame MDE. Metric depth data 1030 is obtained through elementwise multiplication of the scaling factor data 1028 with the scale-invariant depth data 1012. As discussed above, the panoptic segmentation data 1014 may also be used to improve depth estimation around object boundaries.

Any one or more of the processors discussed herein may be implemented as any suitable electronic hardware that is capable of processing computer instructions and may be selected based on the application in which it is to be used. Examples of types of processors that may be used include central processing units (CPUs), graphics processing units (GPUs), field-programmable gate arrays (FPGAs), application specific integrated circuits (ASICs), microprocessors, microcontrollers, etc. Any one or more of the non-transitory, computer-readable memory discussed herein may be implemented as any suitable type of memory that is capable of storing data or information in a non-volatile manner and in an electronic form so that the stored data or information is consumable by the processor. The memory may be any a variety of different electronic memory types and may be selected based on the application in which it is to be used. Examples of types of memory that may be used include including magnetic or optical disc drives, ROM (read-only memory), solid-state drives (SSDs) (including other solid-state storage such as solid state hybrid drives (SSHDs)), other types of flash memory, hard disk drives (HDDs), non-volatile random access memory (NVRAM), etc. It should be appreciated that any one or more of the computers discussed herein may include other memory, such as volatile RAM that is used by the processor, and/or multiple processors.

It is to be understood that the foregoing description is of one or more embodiments of the invention. The invention is not limited to the particular embodiment(s) disclosed herein, but rather is defined solely by the claims below. Furthermore, the statements contained in the foregoing description relate to the disclosed embodiment(s) and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art.

As used in this specification and claims, the terms “e.g.,” “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term “and/or” is to be construed as an inclusive OR. Therefore, for example, the phrase “A, B, and/or C” is to be interpreted as covering all of the following: “A”; “B”; “C”; “A and B”; “A and C”; “B and C”; and “A, B, and C.”

The invention claimed is:

1. A method of estimating a depth of an object within an image, comprising:

obtaining single-frame image data;

obtaining scaling factor data based on the single-frame image data, wherein the scaling factor data is generated using a scaling factor network that is trained as a part of a student network that further includes the depth estimation network;

generating scale-invariant depth data through inputting the single-frame image data into a depth estimation network; and generating metric depth data based on the scaling factor data and the scale-invariant depth data.

2. The method of claim 1, further comprising generating panoptic segmentation data using panoptic segmentation of the single-frame image data, wherein the panoptic segmentation data is used for generating the metric depth data.

3. The method of claim 2, wherein the panoptic segmentation is performed using a panoptic decoder that takes, as input, feature data generated by a feature encoder.

4. The method of claim 3, wherein the feature data is multi-feature fusion data that is or is derived from feature data from two different layers within the feature encoder.

5. The method of claim 1, wherein the scaling factor network is trained by a teacher network based on loss calculated using metric depth data generated by the teacher network and scale-invariant depth data generated by the depth estimation network.

6. The method of claim 5, wherein the scale-invariant depth data of the student network is combined with data output by the scaling factor network in order to generate metric depth data for the student network, and wherein the loss is calculated based on the metric depth data for the student network and the metric depth information of the teacher network.

7. A method of training a depth estimation network, comprising:

inputting image data into a teacher machine learning (ML) model in order to generate metric depth data;

inputting image data into a student ML network in order to generate scale-invariant depth data, wherein the student ML network includes a scaling factor network used for generating scaling factor data and is trained as a part of the student ML network; and training the student ML network based on loss calculated using the metric depth data and the scale-invariant depth data.

8. The method of claim 7, wherein the student ML network includes a depth decoder that is used to generate the scale-invariant depth data and the scaling factor network that generates the scaling factor data that, when combined with the scale-invariant depth data, results in metric depth data of the student ML network.

9. The method of claim 8, wherein the metric depth data of the student ML network is compared with the scale-aware depth data of the teacher network in order to determine the loss.

10. The method of claim 7, wherein the image data input into the teacher ML model is multi-frame image data, and wherein the image data input into the student ML network is single-frame image data.

11. The method of claim 10, wherein the multi-frame image data includes the single-frame image data such that a frame of the multi-frame image data is a frame represented by the single-frame image data.

12. The method claim 7, wherein the teacher network is trained using a training process that includes determining pose information and/or determining panoptic segmentation data for the multi-frame image data.

13. The method of claim 7, wherein the teacher network determines a cost volume between two frames of the multi-frame image data in order to generate the metric depth data.

14. The method of claim 13, wherein the two frames of the multi-frame image data are temporally-adjacent.

15. An image-based depth estimation system, comprising:
an image sensor configured to capture images;
at least one processor; and
memory storing computer instructions that, when executed by the at least one processor, cause the depth estimation system to:
obtain single-frame image data;
obtain scaling factor data based on the single-frame image data, wherein the scaling factor data is generated using a scaling factor network that is trained as a part of a student network that further includes the depth estimation network;
generate scale-invariant depth data through inputting the single-frame image data into a depth estimation network; and
generate metric depth data based on the scaling factor data and the scale-invariant depth data.

16. The image-based depth estimation system of claim 15, wherein the scaling factor network is trained by a teacher network based on loss calculated using metric depth data generated by the teacher network and scale-invariant depth data generated by the depth estimation network.

17. The image-based depth estimation system of claim 16, wherein the scale-invariant depth data of the student network is combined with data output by the scaling factor network in order to generate metric depth data for the student network, and wherein the loss is calculated based on the metric depth data for the student network and the metric depth information of the teacher network.

18. An onboard vehicle computer system having the image-based depth estimation system of claim 15.

* * * * *